United States Patent [19]

Lisak

[11] Patent Number: 4,893,219

[45] Date of Patent: Jan. 9, 1990

[54] HEADLAMP ADJUSTING MECHANISM

[75] Inventor: Stephen P. Lisak, Arab, Ala.

[73] Assignee: Ryder International Corporation, Arab, Ala.

[21] Appl. No.: 251,652

[22] Filed: Sep. 30, 1988

[51] Int. Cl.$^4$ ............................................... B60Q 1/06
[52] U.S. Cl. ..................................... 362/66; 362/270; 362/273; 362/428
[58] Field of Search ....................... 362/61, 80, 66, 69, 362/270, 273, 420, 422, 424, 427, 428, 430

[56] References Cited

U.S. PATENT DOCUMENTS

| 4,524,407 | 6/1985 | Igura | 362/430 |
| 4,665,469 | 5/1987 | Furfari et al. | 362/66 |
| 4,713,739 | 12/1987 | Ryder et al. | 362/424 |
| 4,761,717 | 8/1988 | McMahon et al. | 362/66 |
| 4,774,639 | 9/1988 | Baur et al. | 362/66 |

Primary Examiner—Ira S. Lazarus
Assistant Examiner—Sue Hagarman
Attorney, Agent, or Firm—R. A. Giangiorgi

[57] ABSTRACT

An adjusting mechanism for a headlamp or the like is provided with a molded gear housing having a gear-journaling bore and an apertured cap portion closing the outer end of the bore. A drive gear is rotatably journaled in the bore and is coupled to a drive shaft extending through the apertured end cap portion. A retainer member is mounted within the bore and engages the shaft and bears against the interior surface of the cap portion in order to prevent correspondingly uncoupling and retraction of the shaft end from the housing and the drive gear. The drive gear is rotatably meshed with an adjusting gear which is journaled with a second bore integrally molded in the gear housing. The second gear has a nut portion which is threaded to a linearly movable screw which produces the pivoting torque for adjusting realignment of the headlamp.

22 Claims, 1 Drawing Sheet

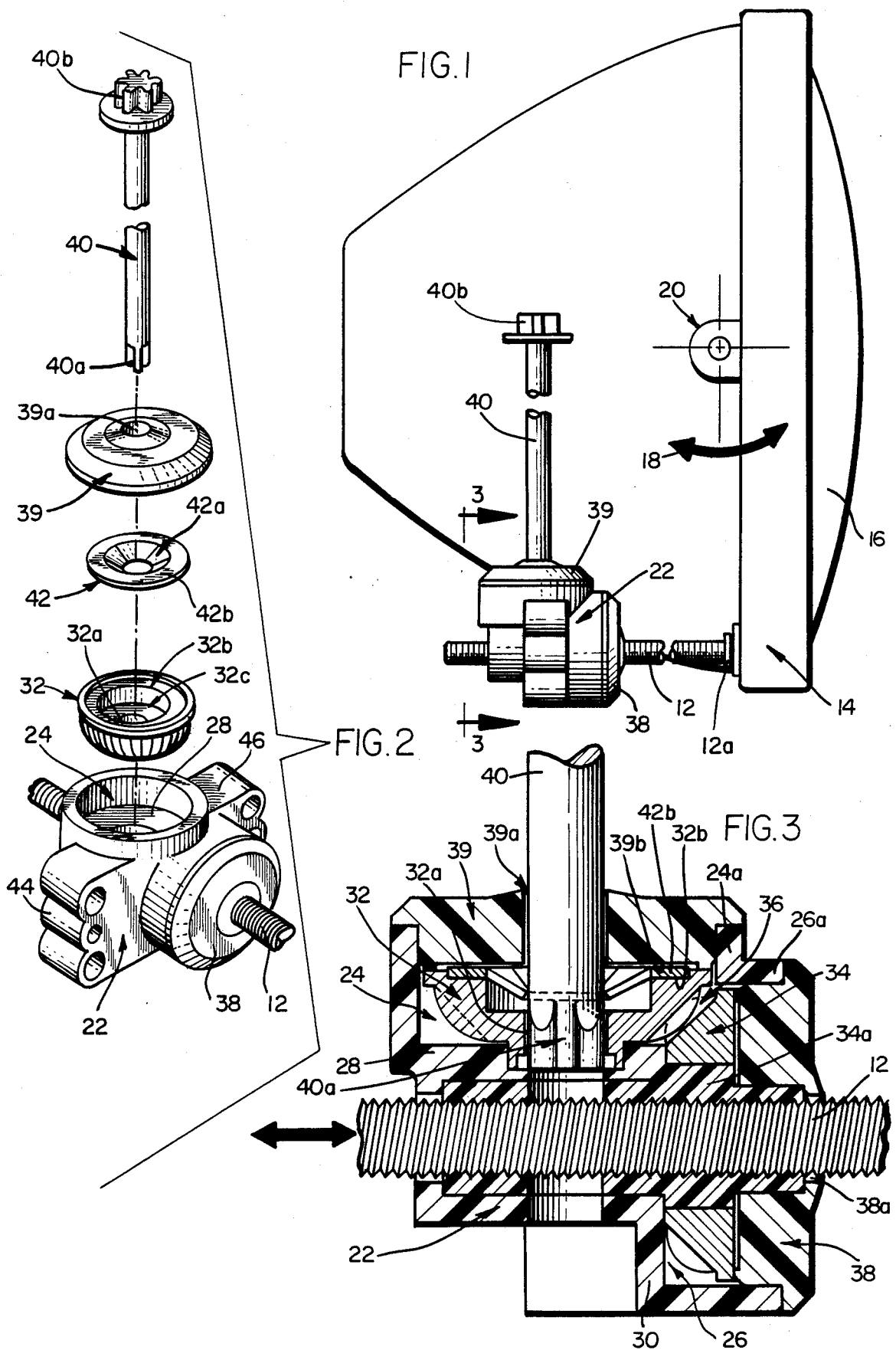

HEADLAMP ADJUSTING MECHANISM

Background of the Invention

The present invention relates to adjusting mechanisms for automobile headlamps or the like, and more particularly relates to improved assembly and construction of such mechanisms.

Modern, aerodynamic automobiles have lead to modular aerodynamically efficient headlamp designs in which the headlamp adjusting mechanism is mounted within the interior of the engine compartment so that the adjusting mechanism is easily accessible as headlamp realignment or adjustment does not require removal of any exterior headlamp framing or molding trim and can be done quickly and easily from the interior of the engine compartment.

In this regard, reference is had to U.S. Pat. No. 4,674,018, the disclosure of which is incorporated herein by reference, and which describes a particularly successful modern adjusting mechanism in which an adjusting screw coupled to the headlamp housing projects rearwardly into the engine compartment and is geared within an integrally molded gear housing to an adjusting drive shaft which is operated by conventional hand tools. The gears can be assembled and sealed within the integral gear housing, while allowing the drive shaft and adjusting screw components to be assembled at a later time with a variety of shaft and screw lengths as required for different model automobiles.

In order to enable the subsequent installation of the adjusting drive shaft within the pre-assembled gear housing, the housing is provided with an apertured cap so that the coupling end of the drive shaft is inserted through the aperture and then affixed to the drive gear with adhesive. However, the adhesive can occasionally seep from the coupling surfaces during installation which can result in interference by the adhesive with the gear rotation and even freeze-up of the gears in extreme seepage of the adhesive into the gear teeth. In addition, when the drive shaft has been coated or painted, the adhesive can deteriorate the paint resulting in release and retraction of the drive shaft from the deteriorated paint and uncoupling from the gear. These disadvantages are eliminated in the adjusting mechanism according to the present invention, which provides an efficient and rapid means for assembly of the drive shaft to the gearbox.

Summary of the Invention

In accordance with the present invention, an adjusting mechanism for a headlamp or the like is provided with a molded gear housing having a gear-journaling bore and an apertured cap portion closing the outer end of the bore. A drive gear is rotatably journaled in the bore and is coupled to a drive shaft extending through the apertured end cap portion. A retainer member is mounted within the bore and engages the shaft and bears against the interior surface of the cap portion in order to prevent uncoupling and retraction of the shaft end from the the housing and, correspondingly, the drive gear. The drive gear is rotatably meshed with an adjusting gear which is journaled within a second bore integrally molded in the gear housing. The second gear has a nut portion which is threaded to a linearly movable screw which produces the pivoting torque for adjusting realignment of the headlamp.

The cap portion of the drive gear bore is molded separately from the gear housing, and the aperture in the cap portion enables the coupling end of the drive shaft to be inserted through the cap and coupled to the drive gear after pre-assembly of the drive gear and retainer member and securement of the cap on the housing. The retainer member locks the coupling of the subsequently inserted drive shaft to the drive gear and prevents retraction of the shaft.

In a preferred embodiment, the drive gear has an internal, multi-lobular coupling recess, to which is coupled a similarly configured mating end of the drive shaft. The retainer member is a stiffly resilient metallic ring which includes a radially inner and annularly serrated gripping configuration which locks on the shaft adjacent the coupled gear. A radially outer annular portion of the retainer ring bears against the interior surface of the cap and reinforces the locked gripping by the serrated portion and prevents uncoupling of the shaft end from the gear and any retraction of the shaft from the housing.

Brief Description of the Drawing

FIG. 1 is a side elevational view of one embodiment of the adjusting mechanism according to the invention coupled for adjustment of a headlamp alignment;

FIG. 2 is an exploded perspective view of the adjusting mechanism shown in FIG. 1; and FIG. 3 is a sectional view of the adjusting mechanism at a plane taken along line 3—3 in FIG. 1.

Detailed Description of the Illustrated Embodiment

Referring to FIG. 1, an embodiment of the adjusting mechanism according to the invention, designated generally by reference character 10, includes a main adjusting screw 12 which is carried by the headlamp housing 14 and has its distal end affixed to the headlamp 16. The adjusting screw 12 is fixed against rotation and thus can only move linearly in response to rotation of the internal gearing within the housing 14. Thus, the linear motion of the screw 12 generated by the mechanism 10 causes the headlamp housing 14 to pivot through an arc 18 about a pivot bearing 20 in order to adjust the vertical alignment of the headlamp 16 in the configuration shown in FIG. 1. In practice, additional adjusting mechanisms 10 are employed to attain horizontal adjustment.

Referring now to FIGS. 2 and 3, the adjusting mechanism 10 includes a generally one-piece housing 22 which provides integrally molded gear-journaling bores 24 and 26. The bores 24 and 26 have respective bottom walls 28 and 30 and provide journaling for respective, beveled gears 32 and 34. The gears 32 and 34 are in meshed engagement at a common opening 36 formed in the respective side walls 24a and 26a of bores 24 and 26 as additionally described, for example in the aforementioned U.S. Pat. No. 4,674,018, the text of which is incorporated herein by reference.

The gear 34, FIG. 3, is referred to as the adjusting gear which is driven by the drive gear 32. The adjusting gear 34 is mounted upon a central, internally threaded nut portion 34a within which the screw 12 is threaded. The screw 12 projects from both ends of the nut portion 34a and extends entirely through the housing 22. The screw 12 is fixed against rotation, such that rotation of the nut member 34a produces linear motion of the screw 12, which linear motion of the screw 12 which provides the torque for the adjusting pivot of the headlamp housing 14. The outer end of the bore 26 is closed by an end cap 38 which is secured and sealed on the bore sidewall 26a and has a central aperture 38a through which the adjusting screw 12 translates coaxially.

The end of the bore 24 is also closed by an end cap 39 secured to the end of the bore sidewall 24a to enclose the journaling of the drive gear 32. The end cap 39 has a central aperture 39a which enables the drive shaft 40, in any of variable lengths, to be inserted through the end cap 39 after the pre-assembly of the gears 32 and 34, and nut member 34a within the bore 24 and securement of the end cap 39. The gear 32 has a central, internal multi-lobular configured coupling recess 32a which receives a mating, multi-lobular coupling configuration formed on the end 40a of the drive shaft 40. In order to prevent uncoupling retraction of the shaft end 40a from the gear recess 32a, a retainer ring 42 is seated on the pre-assembled gear 32 so that the subsequently inserted shaft end 40a will be guided and locked into the coupling gear aperture 32a. The retaining ring 42 has a conical and serrated or segmented radially inner annular portion 42a through which the shaft end 40a passes from the cap aperture 40a. The ring 42 is preferably a stiffly resilient metallic member which is mounted on gear 32 and inserted therewith into the bore 24 prior to enclosure by the end cap 38. The aperture defined by the segmented or serrated locking ring portion 42a is smaller than the outer diameter of the shaft 40. Thus, as shaft 40 is inserted through the conical locking portion 42a, the segments or serration will be spread slightly. The resilient nature of the material of the retaining ring causes the serrated or segmented portion 42a to grip the outer surface of the drive shaft 40. This gripping action is enhanced by the conical configuration of portion 42a which resists any retroactive movement of the shaft 40. That is to say, any attempt to withdraw the shaft 40, will only cause the edge of the serrated or segmented portion 42a to dig into the surface of shaft 40. Accordingly, once assembled the shaft 40 can not be easily removed.

The retaining ring 42 also has a radially outer annular support portion 42b which is seated within an annular recess 32b in the gear 32, and which bears against the interior annular surface 32b to reinforce the locking of the conical ring portion 42a on the shaft end 40a and to prevent uncoupling withdrawal thereof from the gear 32. The conical retaining ring portion 42a is received within a counter bore clearance 32c within the gear 32.

The installation of the shaft-locking retainer ring 42 enables the retainer ring 42 and gear 32, as well as the gear 34 to be pre-assembled within the housing 22 in a mass production operation so that a shaft 40 and an adjusting screw 12 of any desired length can later be installed within the adjusting mechanism 10. This flexibility of design is accomplished without the need for adhesive or any other operation as part of a subsequent and final assembly. The molded housing 2 also includes a pair of opposed, apertured mounting flanges 44, 46 integrally formed for mounting the adjusting mechanism 10 to a frame portion.

In operation of the adjusting mechanism 10 to realign the headlamp 16 or the like, the shaft end 40b and shaft 40 are manually rotated by application of torque with an appropriate tool so that the drive gear 32 coupled by the retainer ring 44 to the shaft is rotated therewith. The drive gear 32 in turn drives the meshed adjusting gear 34 so that the rotation of the nut portion 34a imparts linear motion to the screw 12 in either direction for pivotal realignment of the headlamp 16.

In light of the foregoing description of the embodied adjusting mechanism, modifications will be evident to those skilled in design of such adjusting mechanisms and are within the broad scope of the appended claims.

The invention is claimed as follows:

1. An adjusting mechanism for a headlamp or the like comprising: a molded gear housing having a gear-journaling bore and an apertured cap portion having an interior surface closing one end of said bore; a drive gear rotatably journaled in said bore; a drive shaft extending through the aperture in said cap portion and having one end thereof operatively coupled with said gear within said bore; and a retainer member carrier entirely within said housing and engaging and securing said drive shaft within said bore and bearing against said cap portion in order to prevent retraction of said shaft end from said gear.

2. The adjusting mechanism according to claim 1, wherein said cap portion is molded separately from said gear housing and joined thereto forming said bore end closing.

3. The adjusting mechanism according to claim 1, wherein said retainer member comprises a radially inner frusto-conical annular portion gripping said drive shaft and a radially outer annular portion bearing against the said interior surface of said cap portion.

4. The adjusting mechanism according to claim 3, wherein said gear includes an internal, multi-lobular coupling configuration in coupled mating with an external, multi-lobular configuration formed adjacent said coupled end of said drive draft, and said inner retainer portion includes an annularly serrated gripping configuration locked on said exterior multi-lobular configuration to provide said prevention of uncoupling.

5. The adjusting mechanism according to claim 1, wherein said gear comprises a recess within which said retainer member is seated.

6. The adjusting mechanism according to claim 3, wherein said inner annular portion of said retainer member is seated within a recess formed in said gear and wherein said outer annular portion of said retainer member includes first and second annular, opposing surfaces, said first retainer surface bearing against said interior surface of said cap portion and said second retainer surface being seated within a second recess formed in said adjusting gear.

7. The adjusting mechanism according to claim 1, wherein said gear housing further comprises a second bore providing rotatable journaling of a second gear therein which is rotatably meshed with said drive gear.

8. The adjusting mechanism according to claim 7, further comprising an adjusting member movably coupled to said second gear such that rotation of said second gear imparts linear movement to said adjusting member for adjusting orientation of said headlamp.

9. An adjusting mechanism for a headlamp or the like, comprising; a unitary molded housing having a first gear receiving bore and a second gear receiving bore disposed transversely to said first gear receiving bore, with said bores intersecting at a peripheral location with respect to each; a first drive gear disposed in said first gear receiving bore, and a second adjusting gear disposed in said gear receiving bore, with said gears being engageable at the intersection of said bores, an apertured cap portion having an interior surface closing one end of said first bore; a drive shaft extending through the aperture in said cap portion and having one end thereof coupled to said first gear within said first bore; and a retainer member secured on said drive shaft and carried entirely within said first bore, and bearing against said interior surface of said cap portion in order to prevent uncoupling and retraction of said shaft end from said first gear.

10. The adjusting mechanism according to claim 9, wherein said retainer member comprises a radially inner annular portion gripping said drive shaft and radially outer annular portion bearing against said interior surface of said cap portion.

11. The adjusting mechanism according to claim 10, wherein said first gear includes an internal, multi-lobular coupling configuration in coupled mating with an external, multi-lobular configuration formed adjacent said coupled end of said draft shaft, and said inner retainer portion includes an annularly serrated gripping configuration locked on said exterior multi-lobular configuration to provide said prevention of uncoupling.

12. An adjusting mechanism for an automobile headlamp, comprising: a housing; a rotary drive shaft carried by said housing; an adjusting shaft disposed transversely to said drive shaft and carried by said housing, said adjusting shaft to be operatively coupled to a pivotably mounted headlamp; means within said housing to which said drive shaft is operatively coupled for converting the rotary motion of the drive shaft into motion of said adjusting shaft; and retaining means to maintain the operative coupling of the drive shaft with some means within the housing, said retaining means including a washer-like member carried by said housing proximate an aperture through which the drive shaft is engaged, said washer-like member housing an aperture therein surrounded by and defined by a segmented frusto-conical resilient gripping portion, the diameter of said opening being less than the outer diameter of said drive shaft, such that when said drive shaft is engaged with said housing, the end thereof will pass through the aperture in said washer-like member to flex said segmented gripping portion, with the resilient segmented portion gripping the end of said drive shaft to resist withdrawal thereof.

13. An adjusting mechanism for a headlamp or the like comprising: a molded gear housing having a gear-journaling bore and an aperture through said housing; a drive gear rotatably journaled in said bore; a drive shaft extending through said housing aperture and having one end thereof operatively coupled with said gear within said bore; and a retainer member carried entirely within said housing and engaging and securing said drive shaft within said bore and bearing against said housing in order to prevent retraction of said shaft end from said gear.

14. An adjusting mechanism according to claim 13, wherein said retainer member comprises a resilient metallic composition.

15. An adjustment mechanism according to claim 13, wherein said retainer member comprises a radially inner frusto-conical annular portion gripping said drive shaft and a radially outer annular portion bearing against said housing.

16. The adjusting mechanism according to claim 15, wherein said inner annular portion of said retainer member includes a segmented frusto-conical configuration.

17. The adjusting mechanism according to claim 13, wherein said housing comprises a separately molded cap portion which is joined thereto to close one of said bore.

18. The adjusting mechanism according to claim 16, wherein said gear includes an internal, multi-lobular coupling configuration in coupled mating with an external, multi-lobular configuration formed adjacent said coupled end of said drive shaft, and said inner retainer portion includes an annularly serrated gripping configuration locked on said exterior multi-lobular configuration to provide said prevention of uncoupling.

19. The adjusting mechanism according to claim 13, wherein said gear comprises a recess within which said retainer member is seated.

20. The adjusting mechanism according to claim 16, wherein said inner annular portion of said retainer member is seated within a recess formed in said gear and wherein said outer annular portion of said retainer member includes first and second annular, opposing surfaces, said first retainer surface bearing against said housing and said second retainer surface being seated within a second recess formed in said adjusting gear.

21. The adjusting mechanism according to claim 13, wherein said gear housing further comprises a second bore providing rotatable journaling of a second gear therein which is rotatably meshed with said drive gear.

22. The adjusting mechanism according to claim 21, further comprising an adjusting member movably coupled to said second gear such that rotation of said second gear imparts linear movement to said adjusting member for adjusting orientation of said headlamp.

* * * * *